Figure 1:
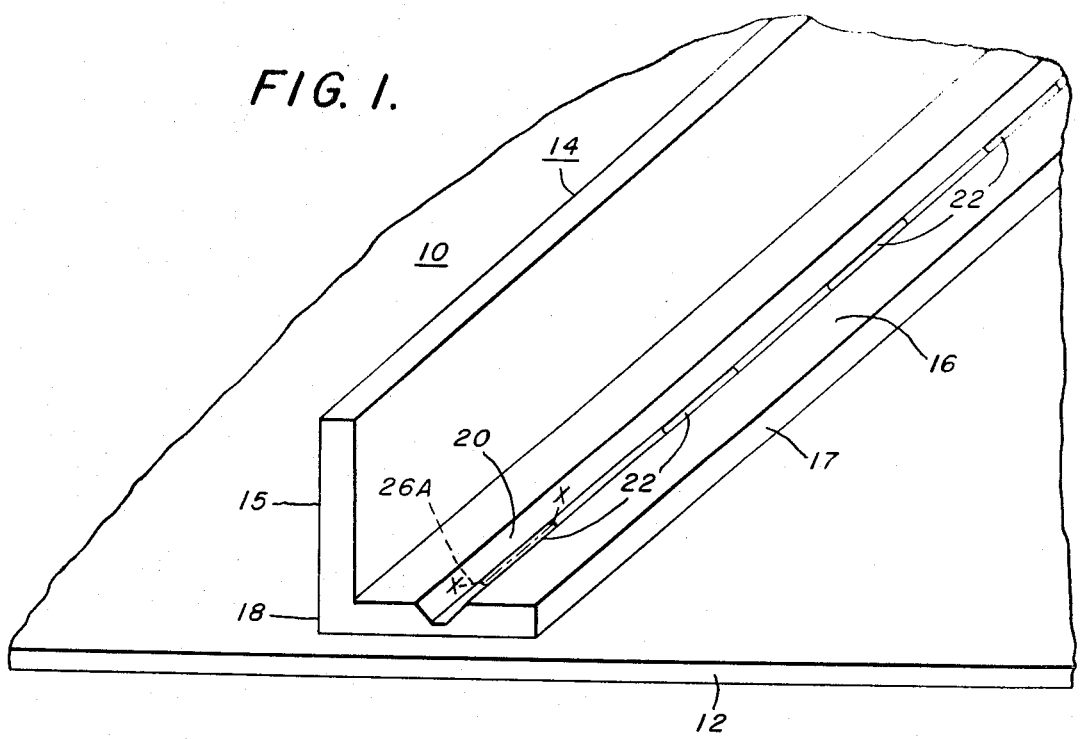

United States Patent [19]
Hoy et al.

[11] 3,770,393
[45] Nov. 6, 1973

[54] RIGID METAL PANELS

[75] Inventors: Malcolm G. Hoy, New Kensington; William R. Tyler, Oakmont, both of Pa.

[73] Assignee: Aluminum Company of America, Pittsburgh, Pa.

[22] Filed: Oct. 22, 1971

[21] Appl. No.: 191,852

[52] U.S. Cl.................. 29/191, 29/471.1, 219/127
[51] Int. Cl........................................... B32b 15/00
[58] Field of Search.................. 219/127; 29/471.1, 29/471.3, 482, 483, 191

[56] References Cited
UNITED STATES PATENTS

| | | | |
|---|---|---|---|
| 3,204,083 | 8/1965 | Fromm et al. | 219/127 |
| 1,810,005 | 6/1931 | Burnish | 29/483 X |
| 3,115,572 | 12/1963 | Taschinger | 219/127 |
| 3,281,930 | 11/1966 | Fordham | 29/471.1 X |

*Primary Examiner*—A. B. Curtis
*Attorney*—Elroy Strickland

[57] ABSTRACT

A rigid panel and a method of making the same, the panel being comprised of a relatively thin gauge sheet of metal and at least one rigid, stiffening member welded to the rear face of the metal sheet. The stiffening member is welded to the sheet by depositing weld metal in spaced apart openings provided in the stiffening member, the openings being located along the bottom of a longitudinally extending groove provided in the stiffner. Opposed side walls of the groove diverge outwardly from the bottom thereof to the surface of the stiffener remote from the metal sheet to provide the groove with a relatively wide dimension at the remote surface, and a relatively narrow dimension at the bottom of the groove and adjacent the metal sheet.

2 Claims, 2 Drawing Figures

PATENTED NOV 6 1973  3,770,393

RIGID METAL PANELS

BACKGROUND OF THE INVENTION

The present invention relates generally to rigid metal panels, and particularly to a novel method and means permitting the welding of stiffening members to the rear of relatively thin gauge sheet metal panels without disfigurement or discoloring of the front face of the panels.

In making metal panels suitably rigid for use as curtain wall structures and architectural panels for building exteriors, for example, or, for panelling employed on the exterior of transit vehicles such as passenger trains, sheet metal structures are employed as the basic panel unit, with elongated metal stiffeners welded to the rear of the surface of the sheet. The stiffeners, as the term implies, stiffens the metal sheet to maintain it in a desired, predetermined configuration, which, in most cases, is a flat, planar configuration. The stiffeners are usually elongated L-shape structures (in cross section), though they may also be U- or Z-shaped, and have heretofore generally been welded to the rear surface of the metal sheets by fillet welds spaced apart along the edges of the stiffener.

Unless the metal sheets are of substantial thickness, in the process of welding the stiffener to the metal sheet, the heat of the weld penetrates the sheet to cause softening and metallurgical changes in the metal of the sheet resulting in disfigurement of and possible discoloration on the front face of the sheet in the area of the weld. As can be appreciated, the process of fillet welding along the edges of a stiffening member provides ample opportunity for softening and deforming of the sheet in the area of the weld and even beyond that of the weld. After deposition of the weld metal, and sheet melting, at the welded surface, as the weld and sheet cool, soldification takes place in the metals of the weld and sheet which tends to shrink the sheet in the area of the weld resulting in deformation of sheet metal that appears on the front face in the form of a bump or a depression.

In addition, with excessive heat input to the weld area, metallurgical changes occur in the sheet which result in color changes appearing on the front face of the sheet, particularly with anodization of sheets made of heat treatable alloys.

To avoid these problems, one obvious solution has been to increase the thickness of the sheet metal of the panel. This solution, however, increases substantially the cost of say a large, high rise building where thousands of such sheets (as architectural panels) are used to cover subsantially the entire exterior surface of the building. To reduce somewhat this increased cost factor, which includes handling the additional weight of the panels, builders will use the thinner panel structures (with the bumps or depressions in front face thereof) for stories of the building that are more than say a hundred feet above the ground. At such a height the disfigurements on the panel faces are not readily visible from the ground level. For the lower stories, the manufacturers of such panels either use a thickner metal sheet for the panels or are required to grind or otherwise treat or cover the front surface of the panels in order to provide panel surfaces free from disfigurement at least as seen by the viewer at ground level. Again, this grinding or treating process adds to the cost of each panel.

In using such panels on the exterior of transit vehicles, all of the panels are, of course, within the range of visual perception except perhaps for those panels on the vehicle roofs. Thus, in the transit car industry a substantial portion, if not all of such panels are required to be ground or otherwise treated to remove or obscure panel weld disfigurements, which adds to the total cost of the cars. If the thickness dimension of each panel is increased to prevent weld disfigurement, the cost and weight of the thicker panels are increased over those of thinner panels, and thus are reflected in the cost and weight of the car.

BRIEF SUMMARY OF THE INVENTION

Briefly, the present invention is directed to a rigid metal panel and a method of making such a panel that allows the use of relatively thin gauge sheets of metal with elongated metal stiffeners welded to the rear face thereof, without deforming the front face of the sheet. This is accomplished by providing the stiffener with a longitudinally extending groove in the surface thereof remote from the metal sheet, and providing narrow openings in the bottom of the groove at spaced apart locations therealong. The groove is formed in such a manner that its side walls diverge outwardly to the surface of the stiffener remote from the sheet to provide the groove with a relatively wide dimension at the remote surface and a relatively narrow dimension at the bottom of the groove and adjacent the sheet. To weld the stiffener to the sheet, the sheet is first placed face down on a chill plate of high heat conductivity, and the stiffener is welded thereto by depositing weld metal in the narrow openings provided in the stiffener and preferably in the groove above the openings. The narrow dimension of groove bottom of the stiffener and that of openings therein provide maximum support of the sheet to prevent or at least substantially reduce the tendency of the sheet material to move into the openings without adversely affecting the integrity of the weld. Further, narrow dimension of the openings minimizes the amount of melting of the metal of the sheet in the weld area (again, without deleteriously affecting the weld) which, in turn, limits the amount of shrinkage stress in the sheet when the weld cools. The chill plate, of course, conducts the heat of weld from the sheet to further minimize sheet melting and shrinkage. In this manner, the stiffener is securely welded to a sheet of relatively thin gauge metal without disfiguring the front of the sheet thereby providing an economy in metal and panel preparation heretofore unavailable in the metal panel art.

THE DRAWING

Figure 2:
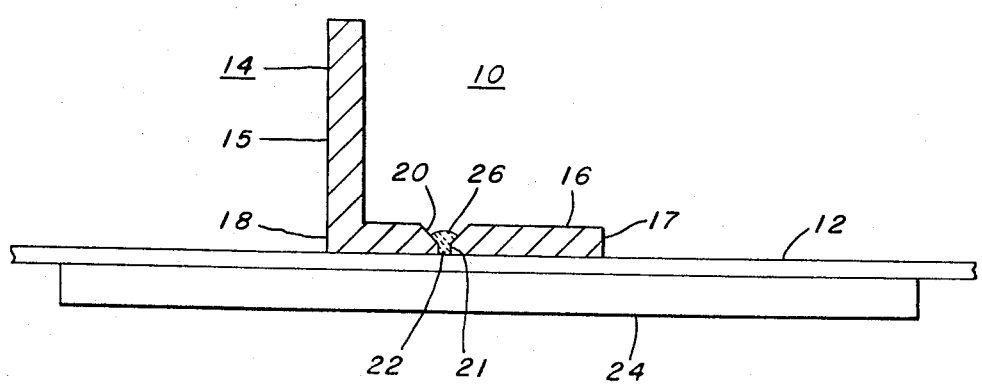

The invention, along with its objectives and advantages, will best be understood from consideration of the following detail description and accompanying drawing in which:

FIG. 1 is a partial perspective view of a rigid panel constructed in accordance with principles of the present invention; and FIG. 2 is an end elevation and partial sectional view of the panel of FIG. 1.

PREFERRED EMBODIMENT

In reference to the drawing, a panel 10 of the invention is shown comprised of a sheet of metal 12 and at least one elongated, L-shaped stiffener or stiffening member 14 having an upstanding portion 15 and a portion 16 having a substantially flat, planar surface disposed against and welded to the rear face of the metal sheet. Depending upon the length and width dimensions of the metal sheet, one or more of the stiffeners 14 may be used, which stiffeners may extend across or lengthwise (or both) of the sheet.

As explained earlier, the prior practice of welding stiffeners to metal sheets has been the use of fillet welds at spaced locations along the toe and heel of the L-shaped member 14, i.e., along edges 17 and 18 (as labeled in the FIGS.) of the L. Such fillet welding, as explained further, lacked control of the heat in and thus the melting of the sheet metal necessary to prevent disfiguration of the front face of the sheet and panel.

In accordance with the present invention, the rear surface of the portion 16 of the stiffener 14 is provided with a longitudinally extending groove 20, the depth of the groove being preferably one half to three quarters of the thickness of the portion 16 to provide a shallow edge 21 (FIG. 2) of metal adjacent the groove bottom. The side walls of the groove diverge or incline away from each other in the direction of the rear surface (i.e., the surface remote from the sheet 12) of the stiffener, thereby giving the groove a truncated V configuration. In this manner, the top of the groove 20 is provided with a relatively wide dimension while the bottom of the groove has a relatively narrow dimension.

The stiffener 14 is preferably inexpensively produced by a continuous extrusion process, the V-shaped groove 20, by virtue of the extrusion process, being simultaneously and inexpensively provided in the stiffener. Extruding the groove, in turn, allows straight sided, narrow openings 22 to be readily and inexpensively punched or otherwise provided in the stiffener since the metal beneath the groove is substantially less than the overall thickness of the stiffener. The openings 22 are provided at spaced apart locations along the length of the groove bottom, and have a width dimension on the order of that of the groove bottom. The openings are elongated in the direction of the groove, as shown in FIG. 1.

To weld the stiffener 14 to the metal sheet 12, the sheet is located face down on a chill plate 24 (FIG. 2), made of a high heat conductivity metal, and the flat surface of portion 16 of the stiffener is disposed on the rear of the sheet, and centered over the chill plate. The stiffener, sheet and chill plate are preferably clamped or otherwise held firmly together to insure good physical contact between the sheet and stiffener for the welding process, and to provide proper pressure between the sheet and the chill plate for the conduction of weld heat from the sheet without creating undue pressure on the sheet in the area of the stiffener openings 22 that would tend to force the metal of sheet inwardly during the welding process.

With this arrangement, weld metal 26 (FIG. 2) is deposited in the openings 22 and in the groove 20 above the openings preferably in the form of a continuous weld bead that begins and ends on a side wall of the groove, as indicated by two spaced x's and a dash line 26A extending therebetween. (In FIG. 1, actual weld deposits are not shown for purposes of FIG. clarity.) The purpose of starting and ending the weld bead on a side wall of the groove is to avoid concentrations of heat in the sheet 12 by using the thicker and heavier portions of the stiffener. By avoiding such heat concentrations in the sheet, heat penetration to the front face of the sheet is avoided so that softening of the sheet metal a substantial distance below the welded surface is avoided. In this manner, the resulting opportunity for metallurgical changes that cause deformation and discoloration on the front face of the sheet is avoided.

Heat input to the sheet is further limited by rapidly laying the weld bead in the groove and openings. High speed welding devices are useful in this regard. Such devices deposit weld metal at evenly controlled, high linear speeds, and can be operated to conveniently begin and end the weld on the side walls of the groove as described above. The groove 20 and the elongated openings 22 permit uninterrupted travel of such welding devices along the length of the stiffener, providing further savings in time and labor costs in producing metal panels, as well as the benefits resulting from limiting heat input to the sheet metal of the panels as discussed above, namely, reduced sheet softening and the opportunity for metallurgical changes to occur in the sheet metal.

By virtue of the narrowness of the groove bottom and the openings 22, the metal of the stiffener portion 16 along the openings provides a maximum support area for the metal of the sheet, and thus substantially limits any tendency of the sheet metal to move into the area of the openings 22 with the heating of the sheet. In this manner, depressions in the front face of the sheet at each of the weld locations as a result of welding the stiffeners to the rear of the panels are substantially eliminated along with the costs of treating the panels to cover such depressions.

In addition, the narrowness of the groove bottom and the openings 22 provides ample stiffener metal around the weld which limits the amount of melting of the sheet metal, in combination with the chill plate 24, to reduce shrinkage of the sheet metal with cooling and solidification of the welded area, resulting in very limited or no upset of sheet metal and thus the essential prevention of raised portions on the front surface of the sheet at the weld locations.

In testing the effectiveness of the present invention, three-sixteenth inch thick, aluminum alloy stiffeners were welded to one-eighth inch thick sheets of architectural aluminum, using one-sixteenth inch wide, approximately two inch long openings 22 in the stiffeners. The bottom of the groove 20 had the same (one-sixteenth inch) width and the incline of the side walls of the groove were about 45° to provide an included angle for the groove of about 90°. In welding such structures, the shallow edges 21 of the metal along the groove 20 melted back somewhat to flow with the weld metal deposited by a welding arc and thereby joined with the metal of the sheet 12. With the cooling of the weld metal and sheet, little or no disfiguration occurred in the front face of the sheet.

In welding stiffeners to architectural aluminum panels with ordinary fillet welds, as described earlier, the sheet thickness would have to be on the order of at least one-fourth of an inch to avoid forming bumps or depressions in the front face of the sheet. It can be appreciated that with thousands of such sheets as would, for example, be used on a large, high rise building, the difference between one-fourth and three-sixteenth of an inch amounts to considerable savings in metal and thus savings in the cost of the building wall.

To test the effectiveness of the present invention on transit car panels, 0.080 inch thick sheets of aluminum alloys providing suitable fatigue and fillet weld strength were welded to aluminum alloy stiffeners of the dimensions and in the manner described above. The results were the same, namely, a good joint was formed between the stiffener and the metal sheet with little or no deformation in the front face of the sheet.

With the use of ordinary fillet welds, the thickness of a transit car, exterior panel would have to be at least one-fourth of an inch in order to avoid disfigurement of the front face of the panel. Again the savings in metal, and thus metal costs, when using a large number of such panels is considerable with the present invention.

From the foregoing description it should now be apparent that a new and useful panel structure, and a method of making the same, have been disclosed in which stiffeners are welded to the rear face of relatively thin metal sheets without disfiguring the front face of the sheet, whereas, heretofore, sheets of larger thickness dimensions had to be used. This is accomplished by providing a narrow groove in the stiffener, with elongated, narrow openings extending through the stiffener in the location of the groove, and sloping the side walls of the groove to provide the groove with a relatively wide dimension at the surface thereof remote from the sheet, and relatively narrow dimensions at the bottom of the groove adjacent the sheet. The grooved stiffener with the openings is disposed on the rear face of the sheet, and welded thereto by depositing weld metal in the openings and groove above the openings. The metal of the stiffener about the openings limits melting of the sheet metal and provides maximum support for the sheet in the area of the weld to limit if not eliminate upset movement of the sheet while the groove in the stiffener allows rapid deposition of weld metal.

While the invention has been described in terms of preferred embodiments, the claims appended hereto are intended to encompass all embodiments which fall within the spirit of the invention.

Having thus described our invention and certain embodiments thereof, we claim:

1. A rigid metal panel structure having an outwardly facing surface unmarred by welds employed to attach a stiffening member to the rear face of said panel, said panel comprising
    a sheet of relatively thin gauge metal having opposed faces providing respectively the outwardly facing surface and rear face of said panel,
    at least one elongated metal stiffening member having a first, planar surface disposed against the rear face of said sheet, said stiffening member having a second surface opposed to said first surface provided with a longitudinally extending groove having opposed side walls that slope from the bottom thereof to said opposed surface to provide the groove with a relatively wide dimension at said opposed surface, and a relatively narrow dimension at the bottom of said groove, and
    openings provided in said stiffening member at spaced apart locations therealong, and located in the bottom of said groove,
    said stiffening member being welded to the rear face of said sheet by weld material deposited in said openings in a manner that limits substantial concentration and penetration of welding heat into the metal of said sheet,
    the metal of said elongated members adjacent the narrow dimension at the bottom of said groove providing maximum support against movement of the sheet material into the opening provided in said stiffening member.

2. A method of making a rigid metal panel having an outwardly facing surface unmarred by welds employed to attach a stiffening member to the rear face of said panel, the method comprising the steps of
    providing a rigid, elongated metal member with at least one substantially flat surface, and with a longitudinally extending groove provided in a surface opposed to said flat surface, said groove having side walls that slope outwardly from the bottom thereof to said opposed surface to provide the groove with a relatively wide dimension at said opposed surface and a relatively narrow dimension at the bottom of said groove,
    providing spaced apart openings in the bottom and along the length of said groove,
    locating said elongated member on the rear face of a sheet of relatively thin gauge metal, and
    welding said elongated member to said sheet by depositing weld material in the openings provided in the groove of said elongated member as welding material is moved along said groove and in a manner that substantially limits the concentration and penetration of weld heat into the metal of said sheet, the metal of the elongated member adjacent the narrow dimension at the bottom of said groove providing maximum support against movement of the sheet material into the openings in said elongated member.

* * * * *